United States Patent [19]

Mc Mahan et al.

[11] Patent Number: 5,497,301
[45] Date of Patent: Mar. 5, 1996

[54] HEADLAMP ADJUSTMENT MECHANISM

[75] Inventors: David R. Mc Mahan, Noblesville; Mark L. Whittemore, New Palestine; Thomas B. Slick, Fishers; Tom Sweetland, Columbus; Steven V. Horsman, Indianapolis; Carey D. Marks; Jan A. Wisler, both of Anderson; Eric S. Donovan, Noblesville; Brian E. Witte, Anderson, all of Ind.

[73] Assignee: General Motors Corporation, Detroit, Mich.

[21] Appl. No.: 388,259

[22] Filed: Feb. 13, 1995

[51] Int. Cl.⁶ ........................ B60Q 1/04
[52] U.S. Cl. ............ 362/66; 362/80; 362/289; 362/428
[58] Field of Search ............ 362/66, 80, 273, 362/287, 289, 396, 418, 427, 428, 284

[56] References Cited

U.S. PATENT DOCUMENTS

| 2,230,853 | 2/1941 | Wells | 177/329 |
|---|---|---|---|
| 2,859,060 | 11/1958 | Davies et al. | 287/90 |
| 3,862,807 | 1/1975 | Doden et al. | 403/135 |
| 4,621,307 | 11/1986 | Weber | 362/66 |
| 4,679,958 | 7/1987 | Mizusawa et al. | 403/143 |
| 4,689,725 | 8/1987 | Saijo et al. | 362/66 |
| 4,707,769 | 11/1987 | Van Duyn | 362/66 |
| 4,707,770 | 11/1987 | Van Duyn | 362/66 |
| 4,707,771 | 11/1987 | Van Duyn et al. | 362/66 |
| 4,870,544 | 9/1989 | Iwamoto | 362/66 |
| 4,889,356 | 12/1989 | Morris | 280/416.1 |
| 4,894,754 | 1/1990 | Levilain | 362/66 |
| 4,901,208 | 2/1990 | DePetro | 362/66 |
| 4,904,107 | 2/1990 | Fukukawa et al. | 403/122 |
| 4,947,306 | 8/1990 | O'Shaughnessey | 362/421 |
| 4,974,123 | 11/1990 | Luallin et al. | 362/66 |
| 5,153,976 | 10/1992 | Benchaar et al. | 29/436 |
| 5,163,746 | 11/1992 | Lisak | 362/80 |
| 5,186,531 | 2/1993 | Ryder et al. | 362/66 |
| 5,270,907 | 12/1993 | Lisak | 362/66 |
| 5,351,170 | 9/1994 | Nagengast et al. | 362/66 |
| 5,360,282 | 11/1994 | Nagengast et al. | 403/131 |
| 5,398,173 | 3/1995 | Ellenberger | 362/273 |
| 5,424,923 | 6/1995 | Young et al. | 362/289 |
| 5,428,511 | 6/1995 | Luallin et al. | 362/428 |

Primary Examiner—Ira S. Lazarus
Assistant Examiner—Y. Quach
Attorney, Agent, or Firm—Ernest E. Helms

[57] ABSTRACT

A headlamp mounting arrangement is provided including a screw with a first end for connection with a headlamp and a second end extending toward a vehicle panel aperture; a retainer body having a base engaged with the vehicle panel in a nonrotative fashion, the retainer body having a head portion extending from the base encircling and mounting the screw and also having an aperture aligned with the screw; a barb piece having a central opening allowing penetration of the screw and also having a head nonrotatively engaged with the base of the retainer body and at least partially encircled thereby, the barb piece head having an outer threaded periphery, the barb piece also having extending from the head through a panel aperture a plurality of legs with outer gripping surfaces extending radially outwardly for contacting an edge of the aperture rim generally opposite the headlamp; and a nut with a central aperture for passage of the retainer body head, the nut having inner threads for threaded engagement of the barb piece head, causing the retainer body base to be clamped to the panel and the barb piece to be pulled toward the retainer piece head and causing the contact surface of the barb piece to be clamped against the panel aperture rim, thereby affixing the screw to the panel to affix the reflector body to the automotive vehicle.

7 Claims, 5 Drawing Sheets 5,497,301

HEADLAMP ADJUSTMENT MECHANISM

FIELD OF THE INVENTION

The field of the present invention is that of automotive vehicle headlamp aiming adjusters. The present invention is particularly useful for adjusters for composite headlamp assemblies.

BACKGROUND OF THE INVENTION

Vehicle headlamps require horizontal and vertical adjustment to meet U.S. government legal headlamp aiming regulations. The typical aiming arrangement for a vehicle headlamp is based on a three point adjustment system. The headlamp is mounted to a fixed portion or panel of the vehicle. A reflector housing of the headlamp unit is attached to the panel along three rod supports which mount the reflector housing away from the vehicle panel. The first rod provides a fixed pivotal point which typically contacts the reflector housing along a lower end. Typically along a top end of the reflector housing is an adjustable length rod support typically called a vertical adjuster which typically contacts the reflector housing along the reflector housing top end vertically aligned with the fixed pivotal point. A horizontal adjuster to adjust the reflector housing in a horizontal axis is typically elevationally aligned with the fixed pivotal point and displaced to an extreme left or right end of the fixed pivot point.

To make vertical adjustments, the vertical adjuster will be manipulated in or out, causing the reflector housing to tilt up or down. In a similar fashion, to make horizontal adjustment to the left or right, the horizontal adjuster will be moved in or out. For a more thorough review of the arrangements of various vertical and horizontal adjustments in the three point adjustment system, see U.S. Pat. No. 5,351,170 to Nagengast et al.

SUMMARY OF THE INVENTION

The present invention provides an alternative to the headlamp mounting arrangement shown in U.S. Pat. No. 5,351,170. The present invention is particularly applicable in situations where access to a portion of the vehicle behind the vehicle panel to which the headlamp is connected is restricted or prohibited, thereby preventing the attachment of a headlamp aiming device to the vehicle panel by conventional fastening devices.

DESCRIPTION OF THE PREFERRED EMBODIMENT

Figure 1:
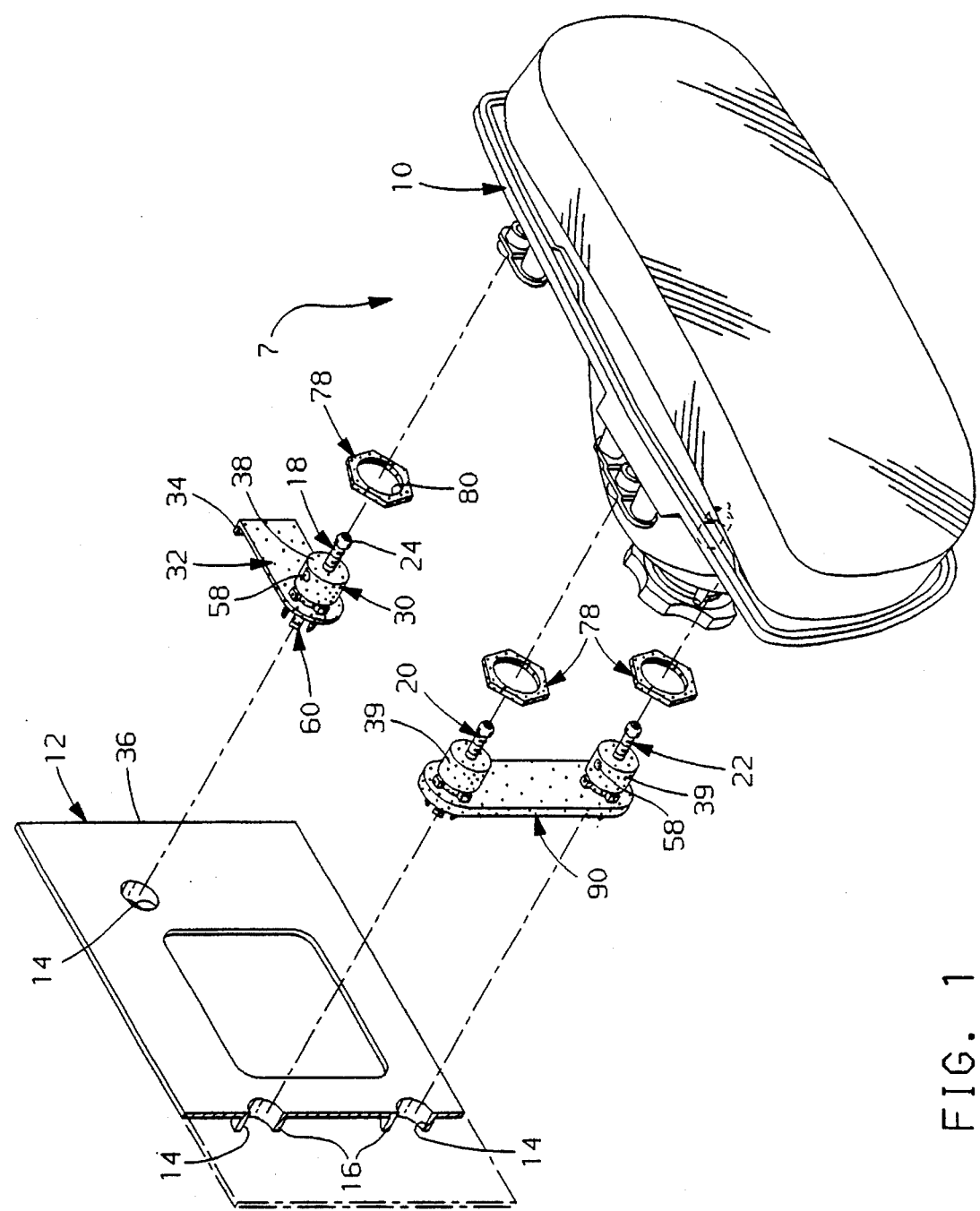
FIG. 1 is a perspective exploded view of a preferred embodiment headlamp mounting arrangement according to the present invention.

Referring to FIGS. 1 through 4, the mounting arrangement 7 of the present invention connects a headlamp reflector body 10 with a vehicle panel 12. The vehicle panel 12 has three rimmed apertures 14. Each aperture rim on a side of the panel 12 away from the reflector body 10 has an edge 16. Extending between the reflector body 10 and the panel 12 are rods, commonly referred to as screws 18, 20 and 22. Screw 20 typically provides a fixed pivot point and in this embodiment is toward a top edge of the panel 12 rather than the more conventional bottom edge. Screw 22 is adjusted inwardly and outwardly to effect vertical adjustment of the reflector body 10. In a like manner, screw 18 is adjusted inwardly and outwardly to effect horizontal adjustment of reflector body 10.

Panel 12 is fixably connected to an automotive vehicle. As mentioned previously, access to the rear end of panel 12 is typically greatly restricted or prohibited after assembly of the vehicle car body.

Figure 2:
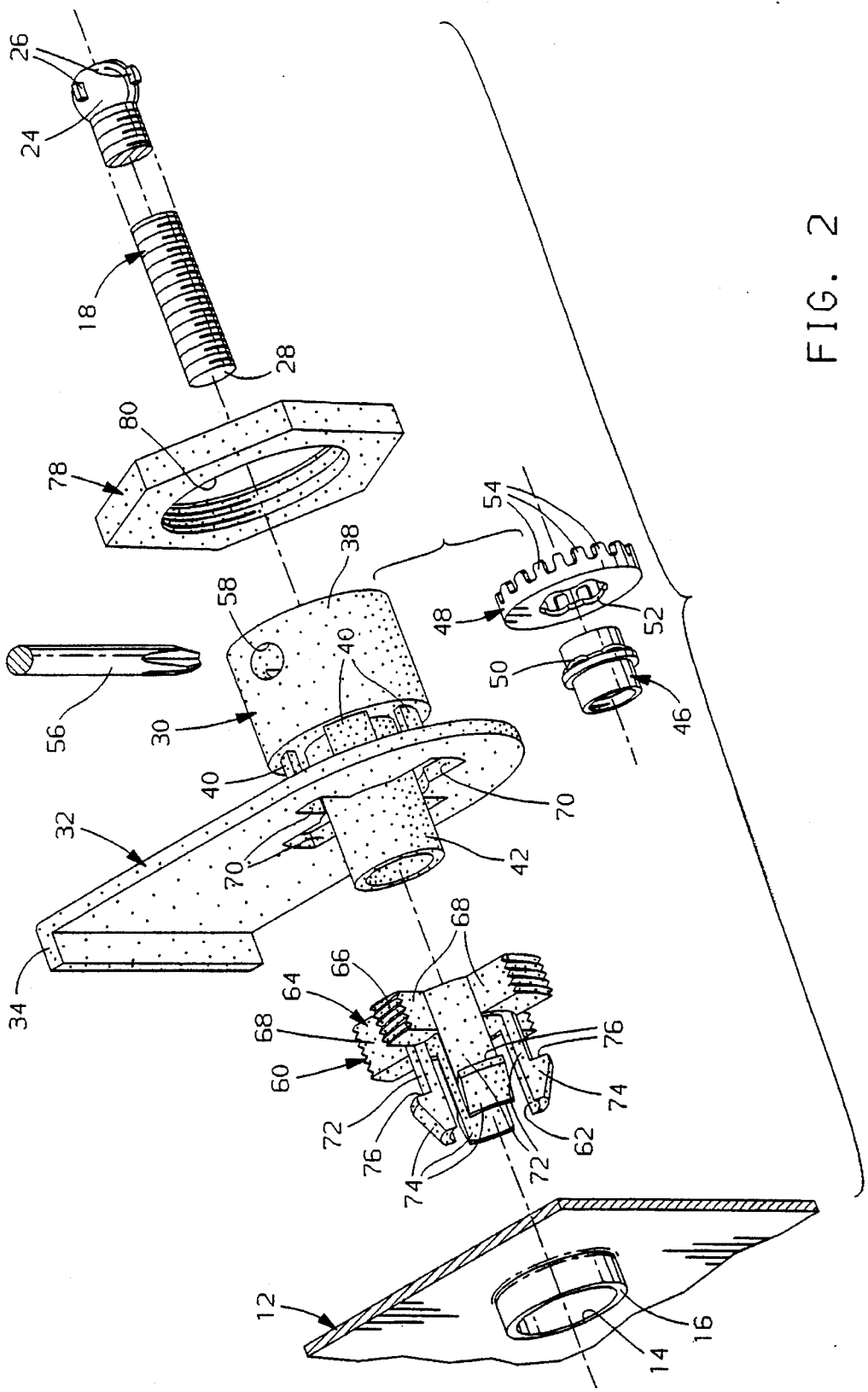
FIG. 2 is an enlarged exploded view of a portion of the headlamp mounting arrangement shown in FIG. 1.

Referring to FIG. 2, the screw 18 has a first balled end 24 and is connected to the reflector housing 10. The connection with the reflector housing 10 will typically be in a pivotal but nonrotative manner. Ribs 26 are provided to prevent rotation between the balled end 24 and the reflector housing 10. The screw 18 has a second end 28 which extends toward the aperture 14 of the panel.

Surrounding the screw 18 is a retainer body 30. The retainer body 30 is typically made from a nylon or suitable plastic. The retainer body 30 has a base 32 which engages with the vehicle panel 12 in a nonrotative fashion. To accomplish the nonrotative relationship between the base 32 and the vehicle panel 12, the base 32 has a flange 34 to provide an inner lock with an edge 36 of the panel. If desired, an alternative could be for a protrusion to provide an inner lock between the base 32 and the panel 12, either from the base into the panel or the panel into the base, or in an alternative embodiment not shown, the base 32 can have such a surface relationship with the panel 12 such that rotation is virtually totally inhibited.

The retainer body 30 has a head portion 38 which extends from the base 32 and partially encircles and mounts the screw 18. The head portion 38 is distanced from the base 32 by four supporting legs 40 which are geometrically spaced. The retainer body 30 also has a sleeve 42 which projects into the aperture 14 of the panel.

Figure 3:
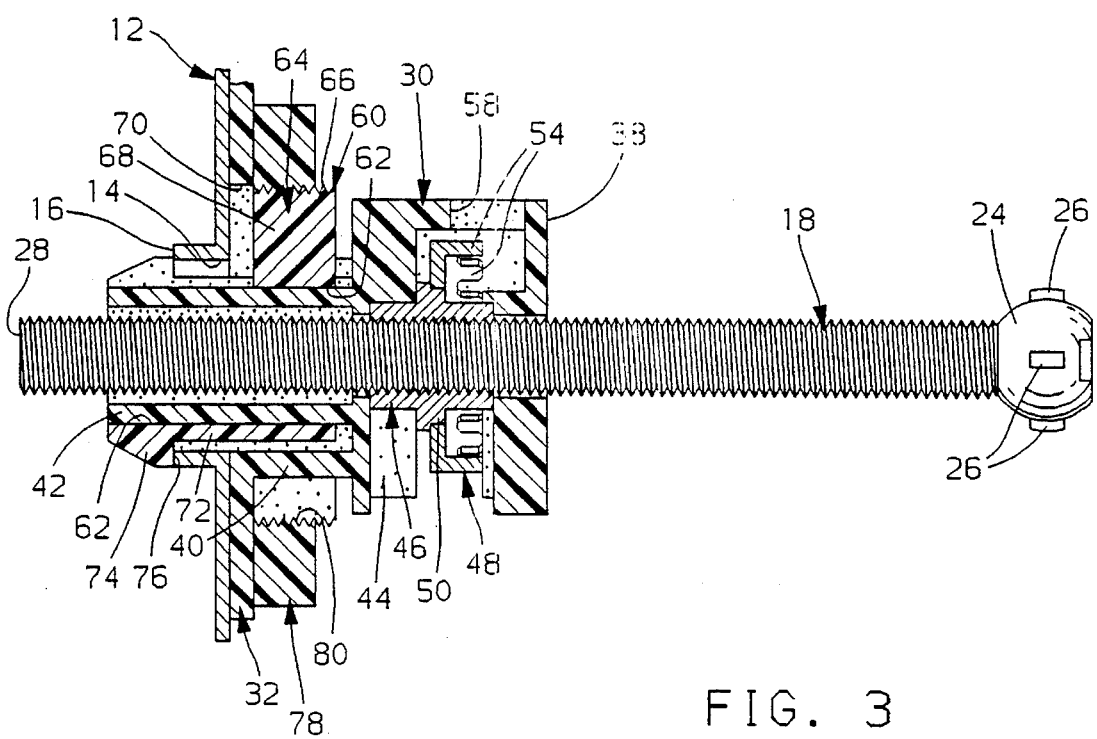
FIGS. 3 and 4 are sectional views of the headlamp arrangement shown in FIG. 1 with the adjusters fully assembled.

As best shown in FIG. 3, the head portion 38 has a radial slot 44 allowing insertion of a bushing 46 along with a stamped gear wheel 48. The bushing 46 is threadably engaged with the threads of the screw 18, and the relationship of the threads and the amount of threaded engagement allowed with the screw 18 can be modified to determine the torque requirements of the mounting arrangement adjustment. As shown in FIG. 3, the bushing 46 is fully engaged with screw 18 along its full length. However, such is not a requirement and may be adjusted as desired to shorten the length of engagement with the threads of the screw 18. The bushing 46 has a flared flange 50 to assure torsional transfer between the bushing 46 and the stamped gear inner bore 52. The stamped gear wheel 48 has gear teeth 54 to receive a torsional input from a Phillips head screw driver 56 which is inserted through a radial opening 58 provided in the retainer body main head portion 38.

Placed within the panel aperture 14 prior to the insertion of sleeve 42 of the retainer body 30 is a barb piece 60. The barb piece 60 has a central opening 62 which allows penetration of the retainer body sleeve 42 and screw 18. The barb piece 60 has a head 64 with an outer threaded periphery 66. The barb piece head 64 has nonrotative engagement with retainer body base 32 which is provided by interlocking arrangement of four spokes 68 which fit into corresponding radial holes 70 of the retainer body base 32. The barb piece 60 is typically made of a pliable plastic-like material such as acetal nylon sold under the trademark Delran 500.

The barb piece 60 has extending from the head 64 four geometrically-spaced (in alternative embodiments, three) legs 72. Each leg 72 has attached thereto an arrowhead 74 having a contact surface 76. The barb heads 74 are pushed through the aperture 14 such that the contact surface 76 is pushed rearwardly of the edge 14 of the aperture. The above insertion of the barb piece 60 will be in a snap-fit type insertion. The barb piece 60 is then rotated to align the arms 68 with the opening 70 of the base 32, while at the same time the sleeve 42 of the retainer body is inserted within the opening 62 of the barb piece. A nut 78 with an aperture 80 is then brought over the head portion 38 of the retainer body and threadably engaged with the threads 66 of the barb piece, pulling the barb piece 60 toward the head 38 of the retainer body, thereby clamping the base 32 against the vehicle panel 12 and clamping the contact surface 76 of the barb piece against the edge 16 of the rimmed aperture. The sleeve 42 prevents the arrowheads 74 of the barb piece from being pushed inwardly, thereby ensuring contact between the contact surface 76 and the rim edge 16.

Upon the tightening of the nut 78, the adjuster screw 18 along with the reflector body 10 are connected to the vehicle via panel 12. Adjustment of the headlamp can be effectuated by insertion of a screw driver into opening 58 for engagement with the gear tooth wheel 48.

Figure 4:
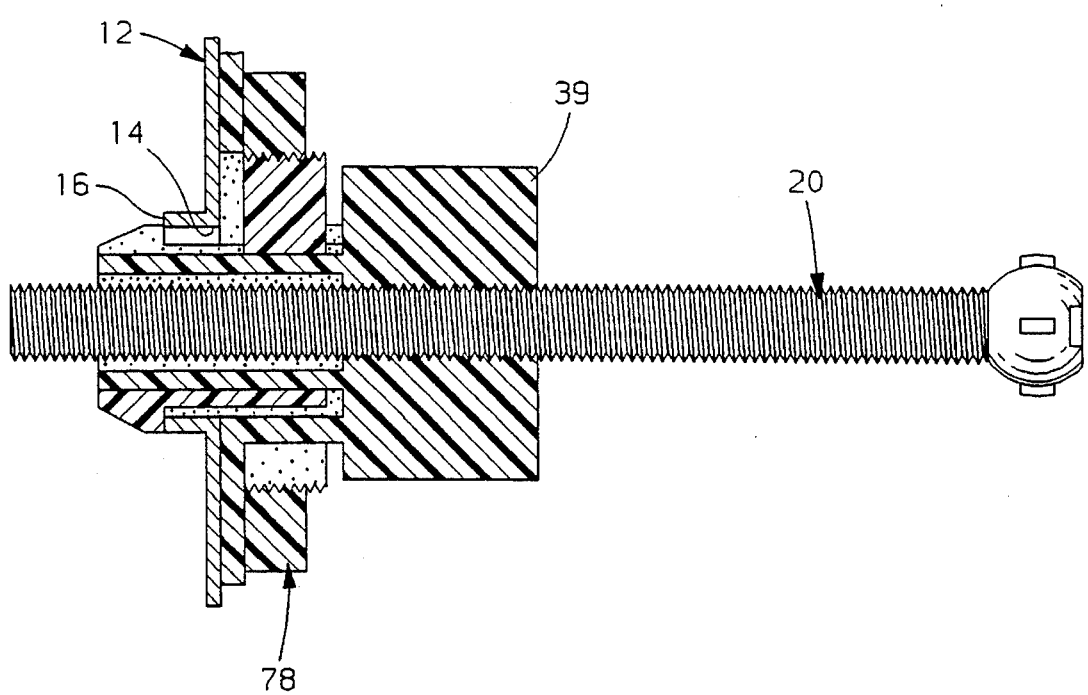

Referring to FIG. 4, adjuster screw 20 has a retainer body 39 which is directly threadably engaged with the adjuster screw since adjuster screw 20 typically provides a fixed pivot point and is therefore not adjusted inwardly or outwardly.

Referring to FIG. 1, adjuster screw 20 and 22 have encircling retainer bodies that are integrally connected into one piece. A one-piece retainer body 91 (FIG. 5) similar to that shown as retainer body 90 in FIG. 1 has a bump 92 for connection with a protrusion of a vehicle panel to inhibit rotation and additionally has three guides 95, 105 and 115 which allow the threading of a screw driver to the hole 58 to effect adjustment for the lower screw.

Figure 5:
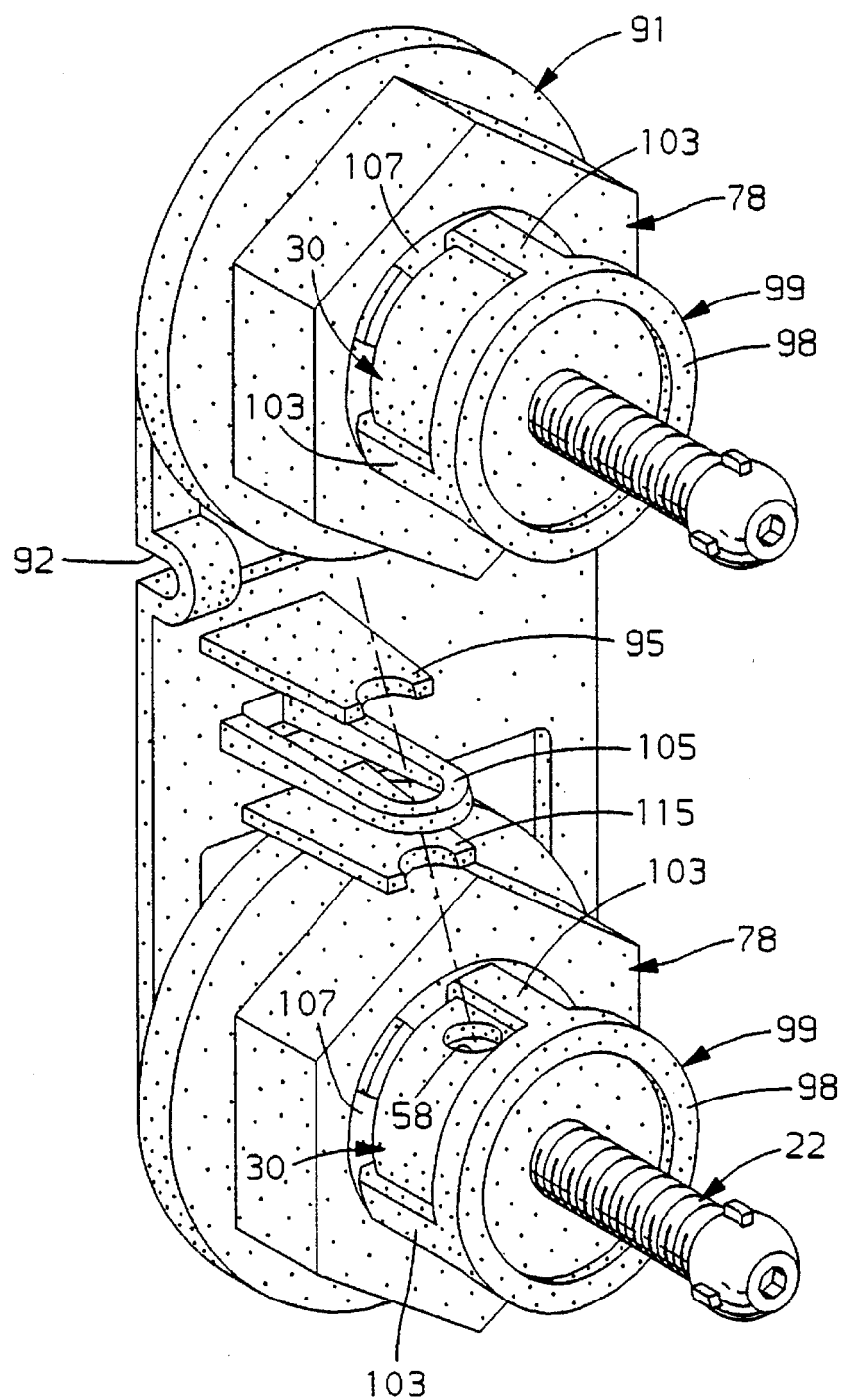
FIG. 5 is a view of an alternate preferred embodiment similar to that shown in FIG. 1 of a preferred embodiment mounting arrangement of the present invention.
Figure 6:
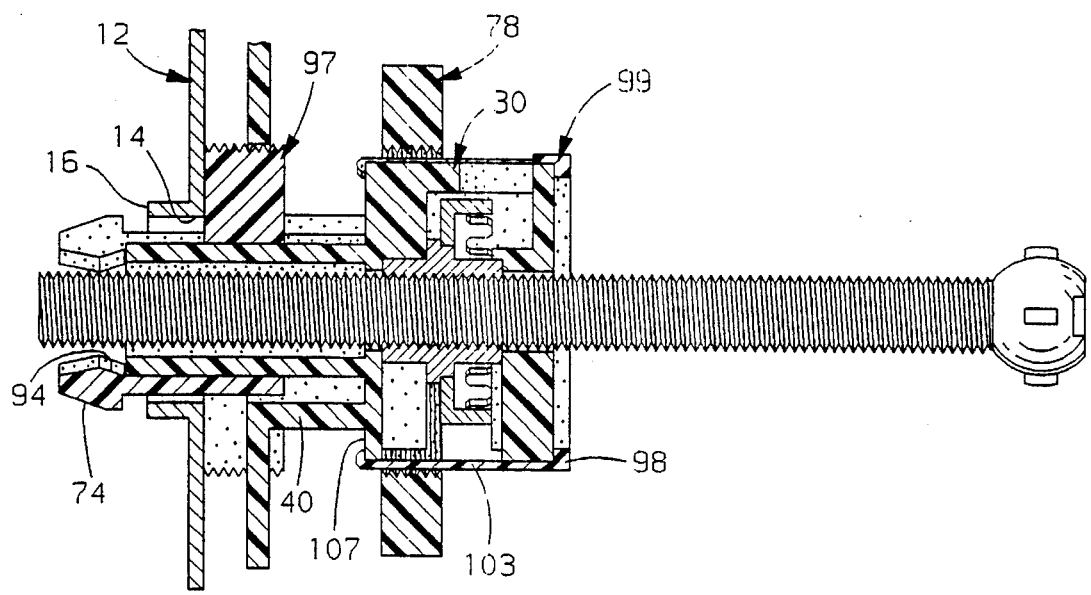
FIG. 6 is a sectioned view of an alternate preferred embodiment of the present invention shown in FIGS. 3 and 4.
Figure 7:
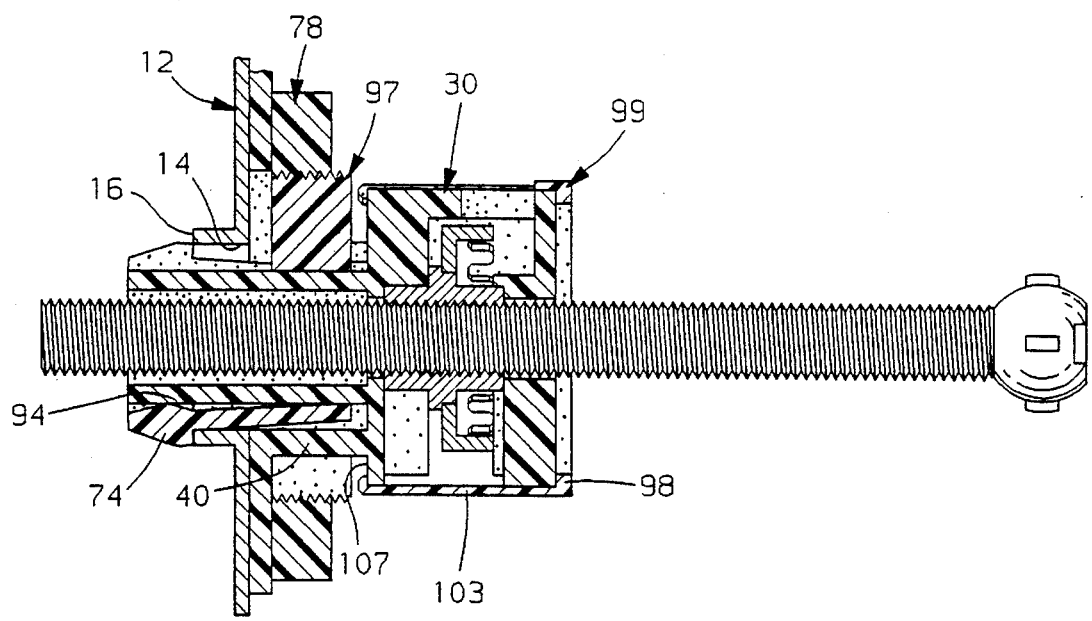
FIG. 7 is a view similar to that of FIG. 6 illustrating an assembled position.

FIG. 6 also shows two further refinements of the present invention having a barb piece 97 with an inner ramp surface 94 to help ensure radial outward movement of the arrowhead 74 upon the tightening by the nut 78. Additionally, FIGS. 5, 6 and 7 illustrate a clip 99 which snap-fits upon the head portion 38 of the retainer body to hold the nut 78 in place during shipment to the assembly facility. The clip 99 has a circular head 98 with three extending legs 103 which snap-fit into openings 107 provided between the legs 40 of the adjuster body head.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive vehicle headlamp mounting arrangement for connecting a reflector body of a headlamp with a panel of an automotive vehicle, the panel having an aperture, the arrangement comprising:

a screw with a first end connecting the reflector body and a second end extending toward the panel aperture;

a retainer body having a base engaged with the vehicle panel in a nonrotative fashion, the retainer body having a head portion extending from the base encircling and mounting the screw, the retainer body having a central aperture generally aligned with the screw and the panel aperture;

a barb piece having a central opening allowing penetration of the screw, the barb piece having a head nonrotatively engaged with the base of the retainer body and at least partially encircled thereby, the barb piece head having an outer threaded periphery, the barb piece also having extending from the head through the panel aperture a plurality of legs with outer gripping surfaces extending radially outwardly with respect to said screw for contacting an edge of the panel aperture generally opposite the headlamp reflector body; and a nut with a central aperture for passage of the retainer body head portion, the nut having inner threads engaging the outer periphery of the barb piece head, causing the retainer body base to be clamped to the panel and the barb piece to be pulled toward the retainer body head and causing the gripping surfaces of the barb piece to be clamped against the panel aperture edge, thereby affixing the screw to the panel to affix the reflector body to the automotive vehicle.

2. A headlamp mounting arrangement as described in claim 1 further including a geared bushing with gear teeth rotatively mounted in the retainer body to threadably engage with the screw, and said gear teeth engagable with a screw driver to impart rotation, thereby translating the screw with respect to the retainer body.

3. A headlamp mounting arrangement as described in claim 1 further including a clip affixed to the retainer body to hold the nut.

4. A headlamp mounting arrangement as described in claim 1 wherein the retainer body has an inner sleeve which projects into the aperture of the barb piece and prevents the legs of the barb piece from moving radially inwardly.

5. A headlamp mounting arrangement as described in claim 4 wherein the barb piece legs, each has have an inner ramp to force the barb piece legs outwardly by contact with the retainer body inner sleeve upon the barb piece being pulled by the nut.

6. A headlamp mounting arrangement as described in claim 5 wherein a geared bushing is rotatably mounted in the retainer body, which is threadably engaged with the screw and has gear teeth engageable with the screw driver to translate the screw with respect to the retainer body.

7. An automotive vehicle headlamp mounting arrangement for connecting a reflector body of a headlamp with a panel of an automotive vehicle, the panel having an aperture rimmed on a side of the panel generally opposite the headlamp reflector body, the arrangement comprising:

a screw with a first end engaging the reflector body and a second end extending toward the panel aperture;

a retainer body having a base engaged with the vehicle panel in a nonrotative fashion, the retainer body having a head portion extending from the base encircling and mounting the screw, the retainer body having a central aperture generally aligned with the screw and the panel aperture;

a barb piece having a central opening allowing penetration of the screw, the barb piece having a head nonrotatively engaged with the base of the retainer body and at least partially encircled thereby, the barb piece head having an outer threaded periphery, the barb piece also having extending from the head through the panel aperture a plurality of legs with outer gripping surfaces extending radially outwardly with respect to said screw for contacting an edge of the aperture rim generally opposite the headlamp reflector body; and a nut with a central aperture for passage of the retainer body head portion, the nut having inner threads engaging the barb outer threaded periphery of the piece head, causing the retainer body base to be clamped to the panel and the barb piece to be pulled toward the retainer body head and causing the gripping surface of the barb piece to be clamped against the panel aperture rim, thereby affixing the screw to the panel to affix the reflector body to the automotive vehicle.

\* \* \* \* \*